(12) United States Patent
Betts

(10) Patent No.: US 6,597,559 B2
(45) Date of Patent: Jul. 22, 2003

(54) LIGHTNING ROCKET

(75) Inventor: Robert E. Betts, Huntsville, AL (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 259 days.

(21) Appl. No.: 09/772,766

(22) Filed: Jan. 31, 2001

(65) Prior Publication Data

US 2002/0101700 A1 Aug. 1, 2002

(51) Int. Cl.[7] ............................................. H01T 23/00
(52) U.S. Cl. ...................................... 361/230; 361/212
(58) Field of Search ................................ 361/212, 213, 361/220, 225, 226, 229, 230, 231; 89/1.8, 1.802, 1.804, 1.807, 1.816, 1.817; 102/347, 348

(56) References Cited

U.S. PATENT DOCUMENTS

| | | | | |
|---|---|---|---|---|
| 3,981,225 A | * | 9/1976 | Smith et al. ................ | 89/1.818 |
| 4,821,139 A | * | 4/1989 | Tomita ........................ | 361/124 |
| 5,413,514 A | * | 5/1995 | Milligan ...................... | 446/36 |
| 5,621,410 A | * | 4/1997 | Gray et al. .................... | 342/26 |
| 6,079,310 A | * | 6/2000 | Yagla et al. ................ | 89/1.816 |

OTHER PUBLICATIONS

Donald W. Zipse , IEEE Titled: "Lightning Protection Methods: An Update and a Discredited System Vindicated", May 7–11, 2000, pp. 155–170.

M. A. Uman et al., "Triggered–Lightning Experiments at Camp Blanding, Florida (1993–1995)" T. IEE Japan, vol. 117–B No. 4, 97, pp. 446–449 No Month.

* cited by examiner

Primary Examiner—Ronald W. Leja
(74) Attorney, Agent, or Firm—Arthur T. Tischer; Dayn T. Beam; Hay Kyung Chang

(57) ABSTRACT

The lightning rocket system of this invention comprises a rocket launcher that is in communication with a detection device that measures the presence of electrostatic and ionic change in close proximity to the rocket launcher that also fires the rocket launcher. This system is designed to control the time and the location of a lightning strike. The lightning rocket can be comprised of solid propellant that has cesium salts added which produces a conductive path when the exhaust gases are discharged from the rocket that is expelled to the static layer of a thundercloud. A conducting lightning rod which is grounded and positioned along side the launch tube for the solid propellant is in communication with the conductive path to thereby control the time and location of a lightning strike from the thundercloud. In a liquid expelled rocket a solution of calcium chloride is used to form a conductive path from a thundercloud. As the rocket flies to the thundercloud this liquid is expelled aft forming a column in the air of particles that are more electrically conductive than the surrounding air. In a similar fashion to the system employing a solid propellant as the conductive producer this conductive path conducts a lightning strike to ground to thereby control the time and location of a lightning strike from the thundercloud.

6 Claims, 5 Drawing Sheets

LIGHTNING ROCKET

The invention described herein may be manufactured, used and licensed by or for the Government for governmental purposes without the payment to me of any royalties thereon.

BACKGROUND OF THE INVENTION

The method of lightning protection which is the oldest as well of the longest length of service dating back two hundred years employs a Franklin rod to collect, control, and convey to earth the awesome and destructive power of lightning. The side effects of allowing thousands of amperes to flow adjacent to and near computers and sensitive electronic equipment can be very costly and undesirable in the advanced technological arena which we now have to protect from lightning. Changes, which have occurred in lightning protection technology, include the renewed debate over sharp pointed versus blunt rods. A further discussion of sharp pointed versus blunt rods has been given in papers by Donald W. Zipse, P. E. Life Fellow, IEEE Titled: "Lightning Protection Methods: An Update And A Discredited System Vindicated" which appears in: Industrial and Commercial Power Systems Technical Conference, 2000, Conference Record, and 2000 IEEE, dated May 7–11, 2000. This update includes a reference to an earlier paper by Zipse Titled: "Lightning Protection Systems: Advantages and Disadvantages" which appeared in IEEE PCIC Conference Record, 1993, pp.51–64, Sep. 13, 1993. The historical and pertinent discussions taken from this referenced paper is set forth below to provide a better understanding of this portion of prior art.

"Franklin chose the sharp pointed rod over the blunt rod to intercept the lightning stroke and transfer the electric charge to earth. Disagreement originated in England with King George III who installed blunt rods in the belief that sharpened rods would attract lightning."

Franklin in experimenting discovered that a sharp iron rod could easily and silently conducts electricity from charged metal spheres. Sharp rods, he theorized, elevated and connected to the earth, could discharge the electricity in thunderclouds. Later, Franklin determined if sharp rods did not discharge the overhead thundercloud, blunt rods would intercept the lightning, strike, shielding the nearby building from danger. The two-prong approach had support; however, further experimentation showed rods with knobs on them would attract a lightning stroke from a greater distance than a pointed rod. The use of blunt rods were favored by King George III who equipped his palace with blunt rods. He felt that sharpened rods might attract lightning and thus promote the mischief that it was hoped to prevent. The Royal Naval adopted blunt rods and incidents of wooden masts being struck were reduced.

Lightning interception systems have included the cone of protection technique and the rolling ball technique. Other techniques exist. One is considered the modified rolling ball technique and the other is hemispheres & collection volumes. Each of these techniques will be briefly discussed below to provide a better understanding of the efforts over the years to better control lightning.

The area of protection that a vertical lightning rod would cover would be that area which is defined in the angle from the tip of the rod to a distance on the ground equal to the height of the rod, a 45° angle. This area under the straight line from the rod tip to the ground is called the "zone of protection". Over time, the angle has been changed to 60° to afford a higher degree of reliability. It has been determined that negative lightning leaders advance in discrete steps of up to 45.7 m (150 feet) as it advances from cloud to earth. When the leader is within 45.7 m (150 feet) of the earth, the leader will be attracted to an object. This explains why a tall structure is struck below the top. This led to a new concept in the late 1970's, the rolling ball concept.

In the rolling ball concept one needs to visualize a sphere of 150 radiuses and roll this ball over the surface of the earth. Where the surfaces of the ball rest on two protruding projections, everything under the surface of the ball would be protected.

As the advanced state of the art has progressed in the last four decades due to the explosive progress in computers/electronics technology, the secondary effect of the lightning stroke became the major concern in many cases. Thus, during the past 250 years lightning rod successfully protected structures from the lightning-caused damage. As noted the secondary effect produced by lightning current which comprise the strong magnetic field around the downward conductor connecting the lightning rod to the grounding system induces voltages of such magnitude that they are capable to cause permanent damage or cause malfunction of sensitive electronic equipment located nearby.

More recently, efforts to replace the conventional lightning rod by a Charge Transfer System (CTS) has improved significantly the lightning protection of structures against direct lightning strokes. The typical CTS consist of four major parts: an ionizer, a grounding system, a ground current collector, and a grounding conductor connecting the ionizer to the grounding system. The CTS system during the recent thirty years has included systems designated as Dissipation Array System (DAS), the Spline Ball Ionizer and Spline Ball Terminal (SBI and SBT), the Ion Plasma Generator (IPG), etc. The CTS system offers much larger area of protection against direct lightning strokes comparing with the performance of the lightning rod. Working in the stroke prevention mode the CTS system also reduces significantly the secondary effect of the lightning stroke.

Prior art method for triggering lightning involves launching a small rocket trailing a thin grounded wire toward a charged cloud overhead. The cloud charge is indirectly sensed by measuring the electric field at ground, values of 4 to 10 kV/m generally being good indicators of favorable conditions for lightning initiation. When the rocket, ascending at about 200 m/s, is about 200 to 300 m high, the field enhancement near the rocket tip launches a positively charged (for the common summer thunderstorm having predominantly negative charge at 5 to 7 km altitude) leader that propagates upward toward the cloud. This leader vaporizes the trailing wire and initiates a so called "initial continuous current" of the order of several hundred amperes flowing from the cloud charge source to the top of the wire residue and further along the wire trace to the instrumental triggering facility. The firing of the rocket motor takes place when the field strength reaches the favorable value mentioned above. state of the art electronic equipment when the proper static charge is detected for potential a lightning strike.

Thus triggering lightning flashes with a rocket system employs typically a one meter long solid fuel rocket and a 0.2 mm diameter copper wire which unspools behind the rocket. The trailing wire serves in the capacity of a grounding conductor connecting the ionizer to the grounding system. When the rocket reaches sufficient altitude, a flash is triggered down the wire quickly vaporizing the wire. The vaporized wire leaves a conductive path to the grounding system. In the event that the wire does not get vaporized because of failure of the trailing wire to intercept the static charge in the storm cloud, a hazard could result whereby the falling wire could fall over transmission lines thereby causing shorting.

An object of this invention is to provide a non-wire path of conductive material to create a controlled conductive path from ground to the static charge at a given time so that the charge is neutralized.

A further object of this invention is to provide a rocket, which is composed, of materials, which produce a minimum of falling-mass hazards after the rocket, is exhausted.

SUMMARY OF THE INVENTION

This invention comprises a device, which is designed to control the time and the location of a lightning strike. By such control the adverse effects of lightning on equipment and property can be minimized or eliminated.

A means for creating a controlled conductive path from ground to the static charge of a storm cloud achieves neutralization of the static charge at a given time and in a controlled manner to thereby minimize or eliminate the damage of a lightning strike.

A rocket motor case and components are provided which are made of cloth such as used in airbags or thin plastic such as polystyrene or polypropylene which is used in drink bottles. The rocket motor itself when exhausted is thus composed of materials, which produce a minimum of falling-hazards. The propellant of the rocket motor includes additives of salts and compounds, which produce an ionized path for the static discharge to travel to the launch site. Such additives can include (but not limited to) cesium salts, sodium chloride, or small metallic particles.

The rocket operates at a relative low pressure, and low velocity thereby minimizing the inert mass. The rocket can be strategically placed in urban or remote area. The rocket launcher is placed on the ground and additionally serves as the ground discharge point to which the controlled conductive exhaust gases directs the lightning discharge. The system device remains passive until a lightning storm or high potential of lightning is present. Detection devices to measure the presence of electrostatic and ionic charge are placed in close proximity to the rocket launcher, which also fires the rocket. Adjustment to differing charge levels can be made in order to have multiple firing in close proximity to each other.

DESCRIPTION OF THE PREFERRED EMBODIMENT (S)

The lightning rocket system is the broad term to include the launch mechanism, the ionic material that is expelled in flight to the static charge buildup in a thundercloud whereby a lightning strike is controlled or directed to a conducting lightning rod that is grounded so that all strikes hit a precise location. The lightning rocket system can be located in a locality where the lightning strike would be away from buildings or facilities which are desired to be protected from lightning strikes.

Figure 1:
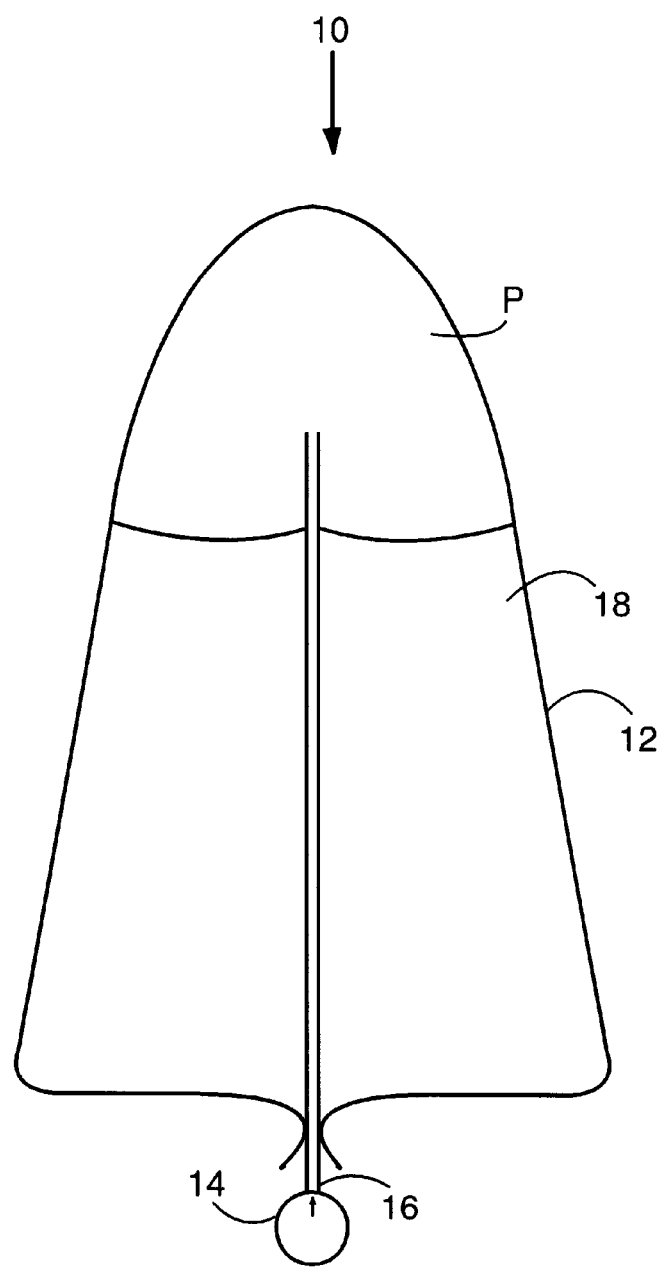
FIG. 1A of the drawing depicts a generic design of a lightning rocket comprising a gas producer, a pressure pipe, a conductive ion source, and a light weight motor case.
FIG. 1B depicts a lightning rocket wherein the gas producer comprises a solid propellant with cesium salts or other ionic salts in a motor case, and a pressure pipe.
FIG. 1C depicts a cloth or light weight motor case comprising a containment vessel for conductive salt solution, a containment vessel for gas pressure, and fold back gyro fins to eliminate fall mass hazard after flight to helicopter low mass at very low velocity.
Figure 1A:
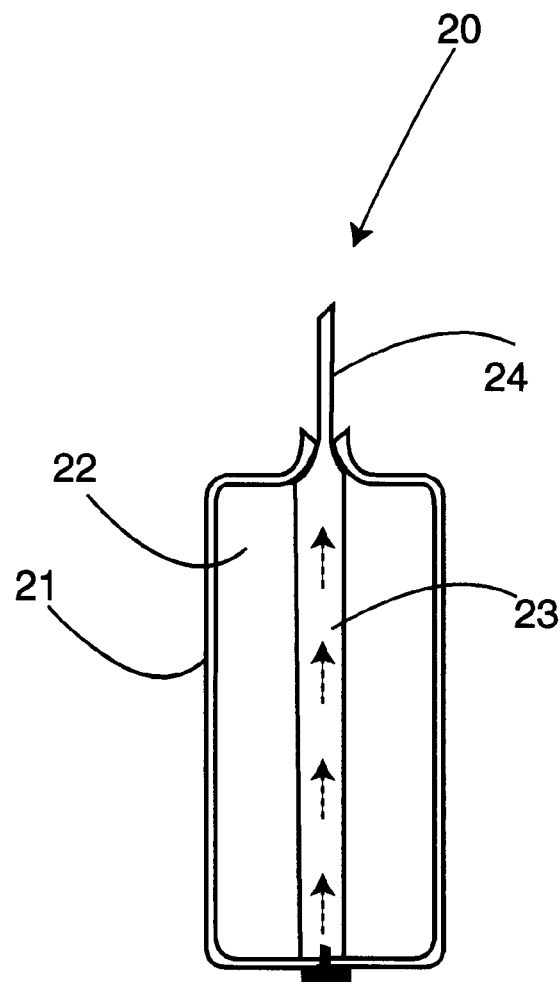

In further reference to the Figures of the drawing, FIG. 1A depicts a generic design of a lightning rocket 10, which comprises a lightweight motor case 12, a gas producer 14, a pressure pipe 16, and a conductive ion source 18. The region designated as P serves to receive the gas pressure from the gas producer to propel the lightning rocket to the static layer of the thundercloud.

Figure 1B:
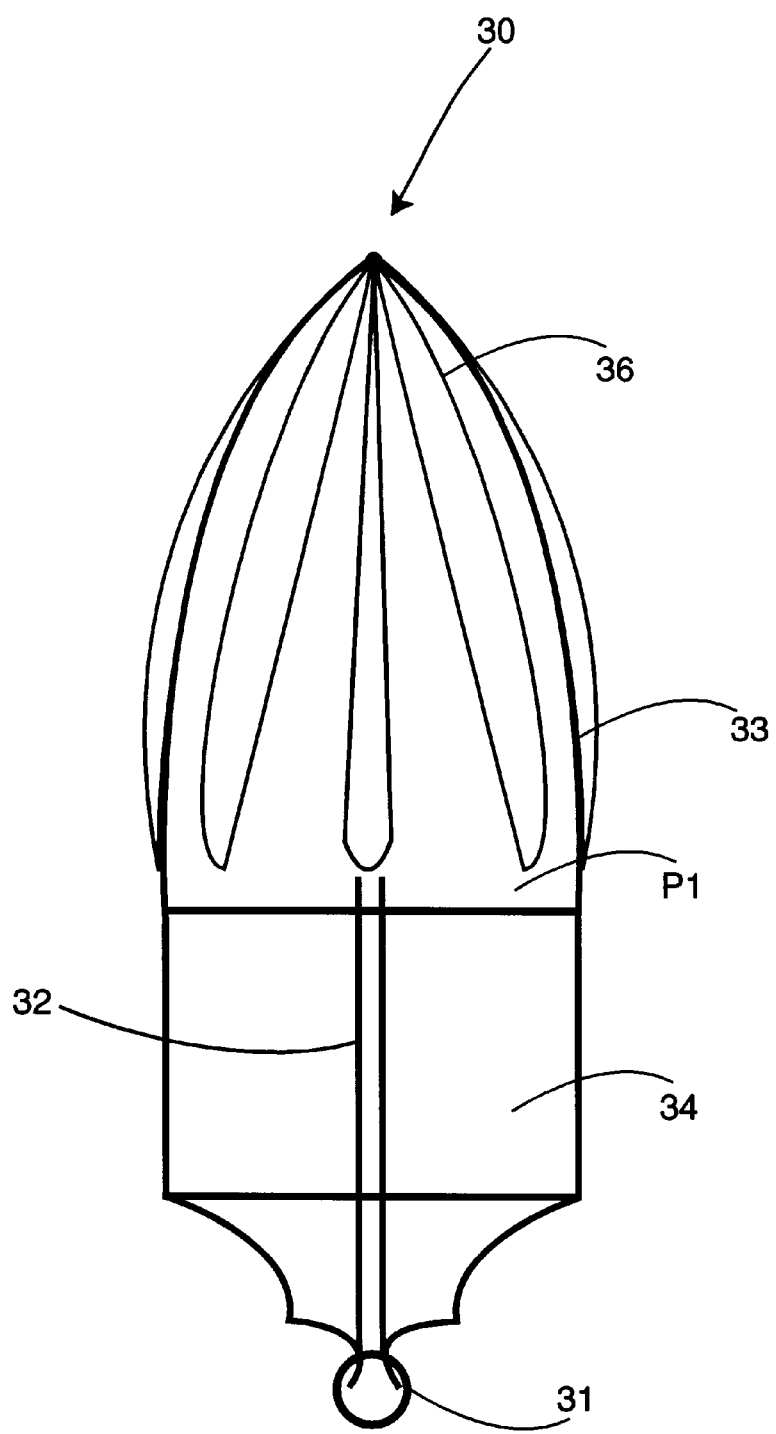

FIG. 1B depicts a lightning rocket wherein the gas producer 20 comprises a solid propellant 22 with added cesium salts or other ionic salts that contained within in a motor case 21. The gas producer 20 discharges gas 23 through a pressure pipe 24 to propel the lightning rocket to the static layer of the thundercloud.

Figure 1C:
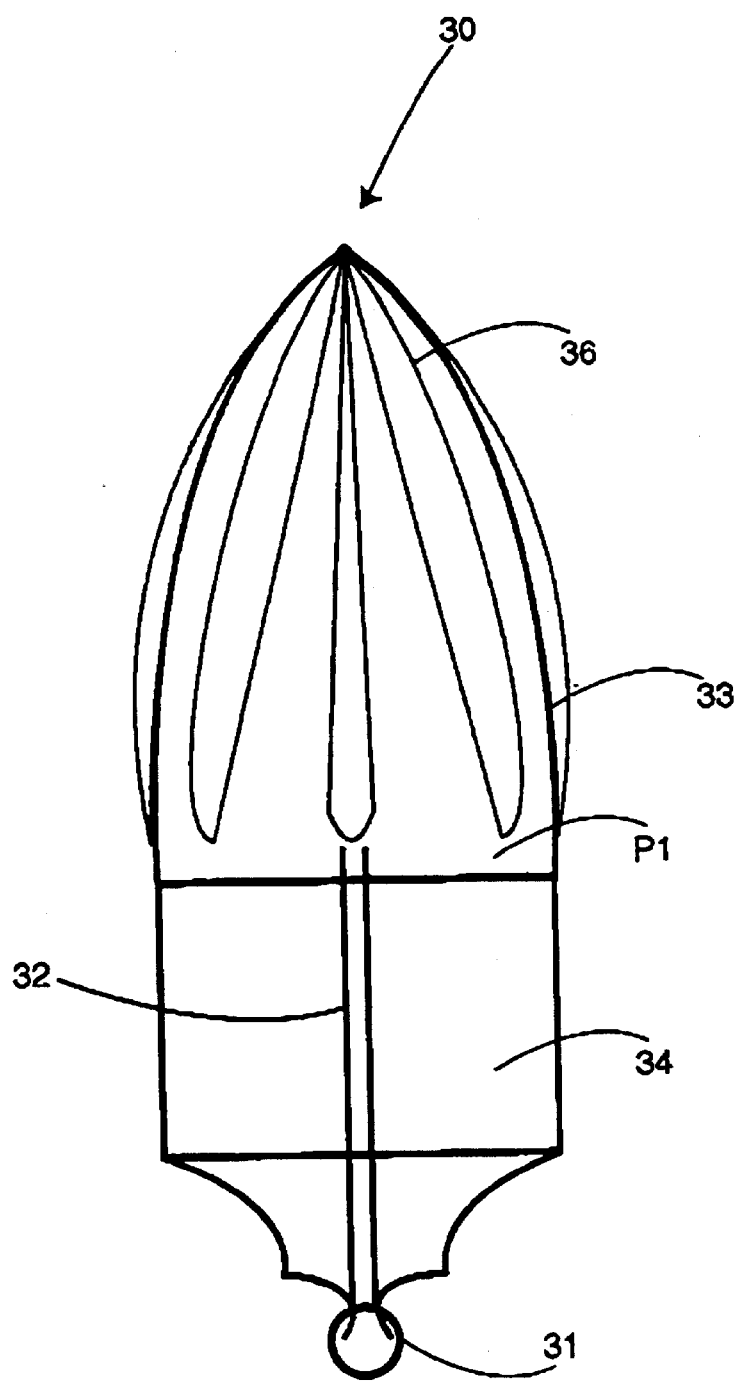

FIG. 1C depicts a lightning rocket 30 wherein the gas producer 31 discharges gas through a pressure pipe 32 to the region designated as $P_1$ to propel the lightning rocket to the static layer of the thundercloud. A cloth motor case 33 contains a conducting salt solution 34 (which functions to conduct a lightning strike) to a conducting lightning rod (not shown), which is grounded. Fold back gyro fins 36 are shown within the cloth motor case to eliminate fall mass hazard after flight for heliocoptering low mass at very low velocity to ground.

Figure 2:
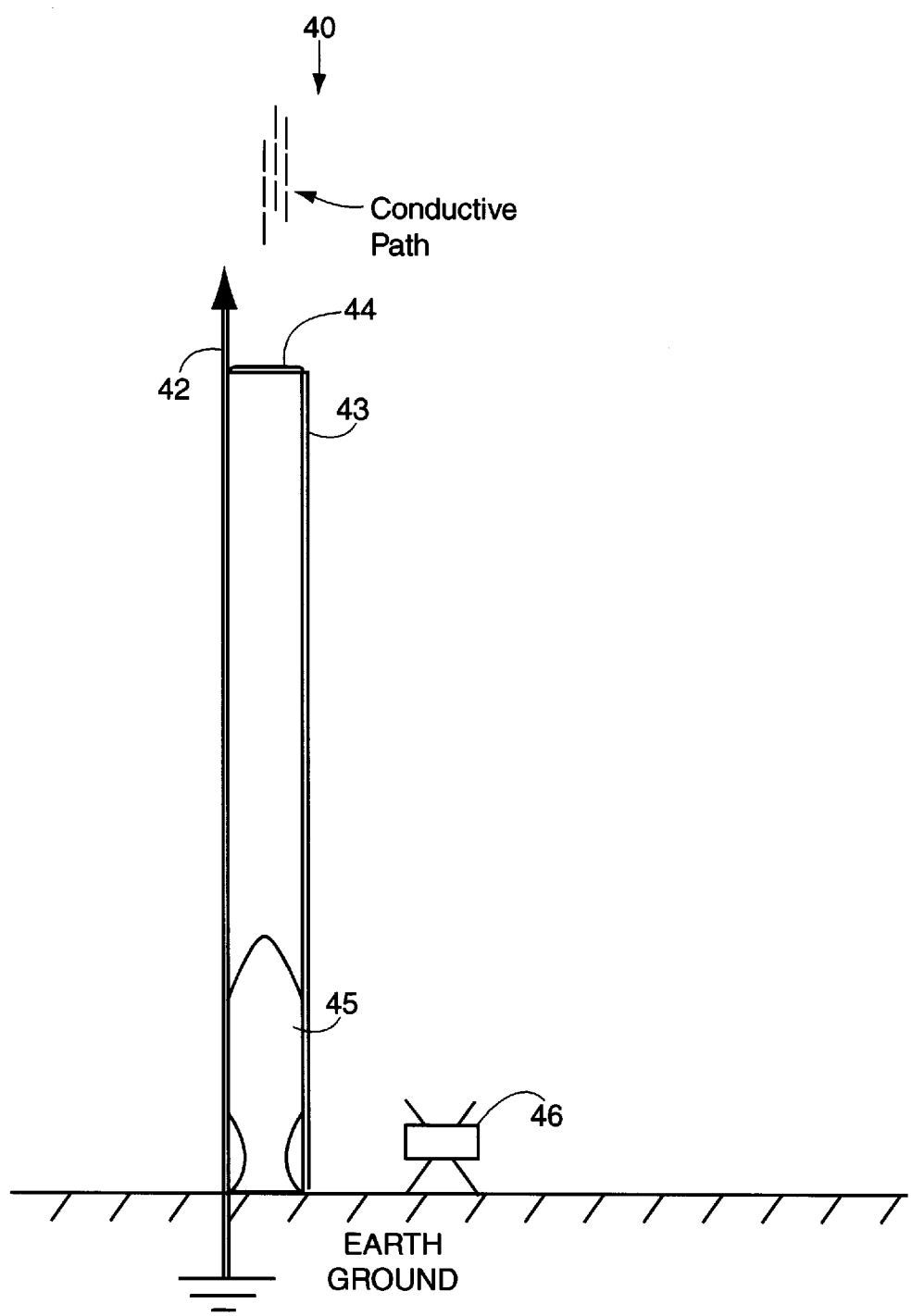
FIG. 2 depicts controlled lightning strike device and associated components.

FIG. 2 which depicts a controlled lightning strike device 40 that includes a conducting lightning rod 42, which is grounded, and which is shown along side launch tube 43. A weather seal 44 is shown at the top of launch tube 43. Within the launch tube is a conductive path producer 45 which can be a rocket motor or mortar like fire works. A firing unit 46 senses static buildup and fires lightning rocket just prior to lightning strike. Coupling between 45 and 46 to trigger or fire 45 can be any convenient means. A conductive path is shown which is created after lightning rocket is fired. The conductive path functions to conduct a lightning strike to a conducting lightning rod 42, which is grounded.

The lightning system, as previously stated, can be located in a locality where lightning strike would be away from buildings or facilities which are desired to be protected from lightning strikes. It is also desired for the lightning system to be portable wherein it can be used in conjunction with tactical missile systems to afford protection from lightning strikes for those missile systems or rockets which are required to be mobile from time to time.

For a lightning rocket wherein the gas producer comprises a solid propellant, cesium salts or other ionic salts are added to the solid propellant. As the rocket burns the cesium is in an ionic state due to the high temperature, and it exists in the exhaust plume in this state some distance until cooling occurs. Upon cooling the cesium salt combines with the water generated by the combusting propellant to form a path to ground, which is electrically less resistive than air. Since there is separation between the conductive particles it is not as efficient or effective as a hard wire connection. When using a wire and a lightning strike does not occur then the wire becomes a debris hazard. Therefore, the gaseous conductive path allows the rocket to be used in populated areas and areas close to conventional electrical transmission lines.

In a liquid expelled rocket a solution of calcium chloride is used. As the rocket flies this liquid solution is expelled aft forming a column in the air of particles that are more electrically conductive than the surrounding air. Like the solid rocket this path from the lightning source to ground is then electrically shorter than through the air alone; thereby creating a lightning strike path if lightning would have occurred near the source of the flying rocket. Since the path is controlled this gives protection to any adjacent structures. And it is also debris less and forms no hazards to the surrounding areas. Other salts such as sodium chloride can be used, but calcium chloride acts as antifreeze which allows for long term storage and use in cold climates.

I claim:

1. A controlled lightning strike system wherein an ionic material is expelled in flight to the static charge buildup in a thundercloud whereby a lightning strike is controlled or directed to a conducting lightning rod that is grounded so that all lightning strikes hit a precise location, said controlled lightning strike system comprising:

i. a launch tube which is vertically mounted and which is provided with a weather seal at the top of said launch tube;

ii. a conducting lightning rod which is secured to said launch tube and extended past the top of said launch tube, said conducting lightning rod grounded at the bottom thereof;

iii. a conductive path producer positioned within said launch tube; and, iv. a firing unit in electrical communication with said conductive path producer which functions to sense static buildup and fires conductive path producer just prior to conditions for a lightning strike.

2. The controlled lightning strike system as defined in claim 1 wherein said conductive path producer is in the form of a solid propellant composition with added ionic salts selected from sodium chloride, calcium chloride, and cesium salts and contained within a rocket motor case.

3. The controlled lightning strike system as defined in claim 2 wherein said system is portable.

4. The controlled lightning strike system as defined in claim 1 wherein said conductive path producer is in the form of a cloth or plastic motor case having an upper portion and a lower portion, said upper portion being in communication with a pressure pipe, said pressure pipe extending through said lower portion of said cloth or said plastic motor case to a gas producer that produces gas pressure which is discharged to said upper portion of said cloth or plastic motor case to propel the cloth or plastic motor case during launch, said lower portion of said cloth or plastic motor case containing an ionic salt solution for expelling aft of the cloth or plastic motor case during launch, said ionic salt solution rendering the air containing the solution more conductive than the surrounding air.

5. The controlled lightning strike system as defined in claim 4 wherein said system is portable.

6. The controlled lightning strike system as defined in claim 5 wherein fold back gyro fins are additionally contained within said cloth or plastic motor case to eliminate fall mass hazard after flight for heliocoptering low mass at very low velocity to ground.

* * * * *